Patented Dec. 13, 1932

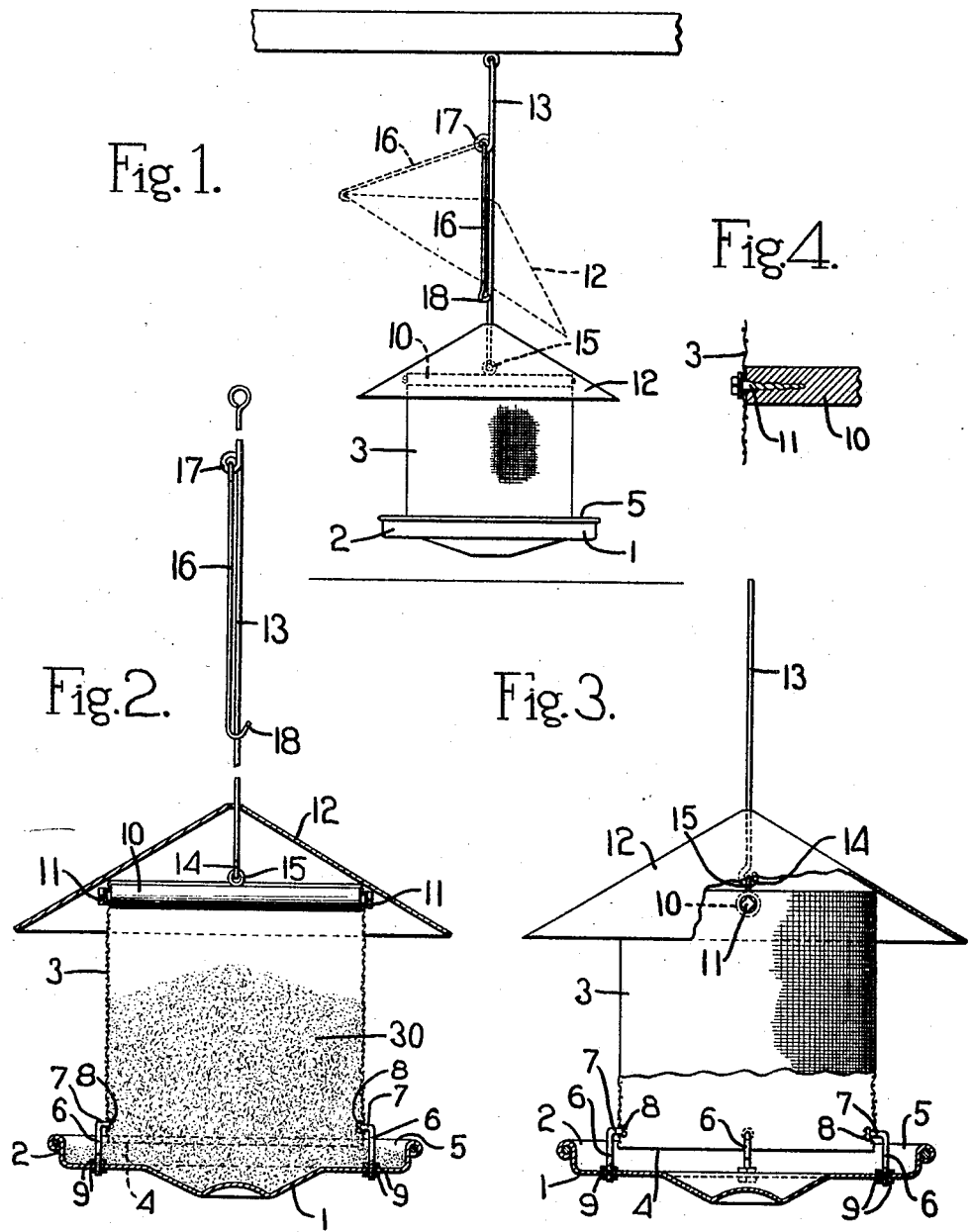

1,891,042

UNITED STATES PATENT OFFICE

JOSEPH F. BENOIT, OF WELLS, MAINE

CHICKEN FEEDER

Application filed June 30, 1931. Serial No. 547,817.

This invention relates to poultry feeders and it has for one of its objects to provide a poultry feeder which is relatively simple and inexpensive to manufacture and which is so constructed that the poultry may feed therefrom with a minimum wastage of chicken feed.

Other objects of the invention are to improve poultry feeders in the various particulars which will be more fully hereinafter pointed out.

In the drawing:

Fig. 1 is a view of a chicken feeder embodying my invention;

Fig. 2 is a sectional view;

Fig. 3 is a view taken at right angles to Fig. 1 with a part broken out;

Fig. 4 is a section through one end of the handle member.

My improved poultry feeder is in the form of a hopper or container which comprises a base member 1, having upturned peripheral edge 2 and a cylindrical side wall 3 forming with the base a hopper or chamber to receive the poultry feed 30. The cylindrical wall 3 is preferably made of a suitable wire mesh and it is so secured to the base 1 that the lower edge 4 of the wall 3 is spaced somewhat above the base 1, but is located below the top of the upturned edge 2 of the base. The base 1 is of larger diameter than the cylindrical wall 3 so that an annular space 5 is provided from which the poultry may take the food.

Any suitable means for connecting the cylindrical wall 3 to the base 1 may be employed. As herein shown the base has a plurality of posts 6 rising therefrom, the upper ends of which are bent inwardly as shown at 7 and extend through openings in the wire mesh wall 3, the bent ends of said posts being provided with heads 8.

These posts are shown as screw-threaded and are locked to the base 1 by nuts 9 screw threaded on the posts and engaging the top and bottom faces of the base. This provides an adjustable connection by which the cylindrical wall 3 may be adjusted vertically relative to the base to provide a greater or lesser space between the bottom of the wall 3 and the base depending upon the character of the food which is being used.

Extending diametrically across the upper end of the wall 2 is a bar 10 which serves not only to brace the wall at its upper end but also serves as a handle by which the container may be carried. This bar 10 is illustrated as being made of wood and it is secured in place by bolts 11 which are screwed into the ends thereof and pass through the wall 3.

12 is a cover member which is preferably made of sheet metal and has a general conical shape. The cover is made larger than the base so that the periphery of the cover extends beyond that of the base. The cover is thus large enough so that the drip of rain of water which is shed therefrom will be outside the base.

The feeder is intended to be suspended at a suitable height above the ground. For this purpose there is provided a suspender member 13 which may be in the form of a wire and which extends downwardly through an opening in the cover 12 at the apex thereof. Said suspender member has a hook 14 at its lower end which is adapted to hook into a screw eye 15 with which the handle bar 10 is provided.

The suspender member 13 may be attached to any suitable support and it serves not only as a suspending support for the container but it also serves to hold the cover in place by reason of the fact that it extends through an opening in the cover.

The cover can be raised, however, to add fresh chicken feed to the container by simply sliding it upwardly on the suspender.

I have provided herein means for holding the cover in a raised or inoperative position in order to avoid the necessity of manually holding the cover raised when fresh chicken feed is being supplied to the container.

The suspender 13 has a cover-supporting member 16 pivotally connected thereto at 17. This member 16 is provided with a hook 18 at its lower end and it is used to support the cover 12 in an elevated position by first raising the cover and then engaging one edge of the cover with the hook 18 as shown in dotted lines in Fig. 1. When the cover is thus supported it is out of the way so that fresh chicken feed may be easily supplied to the container at its open upper end.

When the hook 18 is released from the cover the latter will gravitate into its operative position and will be held in correct position by the suspender 13.

When the container is to be carried from one place to another, the cover and suspender can be readily removed and the container may then be transferred by the handle bar 10.

The use of reticulated side walls for the container is of advantage, for when the poultry are feeding from the container some of them will take the food from the spaces between the upturned peripheral edge 2 of the base and the cylindrical wall 3 and others will peck at the cylindrical wall in an effort to take food therefrom. This operation will serve to jar or vibrate the container sufficiently so that the feed will settle down in it as it is taken from the lower end.

Moreover, the amount of chicken feed in the container is always readily observable through the wire mesh wall and it is not necessary to remove the cover to determine whether or not the container needs refilling as would be the case if the side walls were of sheet metal.

I claim:

1. A poultry feeder comprising a container having a bottom member provided with an upwardly curved peripheral edge, a cylindrical side wall member formed of wire mesh, means to secure said wire mesh member to the bottom member with the lower edge of the wire mesh member spaced above the bottom member, a rigid handle member extending diametrically across the wire mesh member at the top thereof and secured thereto, a suspender connected to the handle member and by which the container is suspended, a cover for the container having an opening through which the suspender extends, and a cover-supporting hook pivotally connected to the suspender at a point above the cover and having a length to engage the edge of the cover when the latter is raised from the container and thereby hold said cover raised.

2. A poultry feeder comprising a container having a bottom provided with an upwardly-curved peripheral edge, a cylindrical side wall member formed of wire mesh, means to secure said side wall member to the bottom member with the lower edge of the side wall member spaced above the bottom member, a rigid handle member extending diametrically across the side wall member at the top thereof and secured thereto, a suspender member connected to the handle member and by which the container is suspended, a cover for the container having an opening through which said suspender extends and a cover-supporting hook pivotally connected to the suspender, said hook having a length approximately equal to the radius of the cover and adapted to engage the edge of the cover and hold the latter is raised position.

In testimony whereof, I have signed my name to this specification.

JOSEPH F. BENOIT.